(12) United States Patent
Parry et al.

(10) Patent No.: US 8,221,129 B2
(45) Date of Patent: Jul. 17, 2012

(54) WEARABLE WOUND SIMULANT

(75) Inventors: David Parry, Yardley, PA (US); Daniel Parry, Dublin, PA (US); Daniel Pipito, Feasterville, PA (US); Brian Letizia, Brick, NJ (US); Morris Ravich, Beckley, WV (US); Daniel Smith, Hatboro, PA (US)

(73) Assignee: Techline Technologies, Inc., Willow Grove, PA (US)

( * ) Notice: Subject to any disclaimer, the term of this patent is extended or adjusted under 35 U.S.C. 154(b) by 1079 days.

(21) Appl. No.: 12/131,980

(22) Filed: Jun. 3, 2008

(65) Prior Publication Data

US 2009/0298034 A1 Dec. 3, 2009

(51) Int. Cl.
*G09B 23/28* (2006.01)

(52) U.S. Cl. ........................ 434/272; 434/274

(58) Field of Classification Search .................. 434/272, 434/274
See application file for complete search history.

(56) References Cited

U.S. PATENT DOCUMENTS

| | | |
|---|---|---|
| 3,027,655 A | 9/1959 | Alderson |
| 2,945,304 A * | 7/1960 | Niiranen et al. ............. 434/268 |
| 3,852,893 A | 12/1974 | Smrcka |
| 4,182,054 A | 1/1980 | Wise et al. |
| 4,481,001 A | 11/1984 | Graham et al. |
| 4,596,528 A * | 6/1986 | Lewis et al. .................. 434/270 |
| 2009/0098521 A1 | 4/2009 | Kuo et al. |

FOREIGN PATENT DOCUMENTS

| | | |
|---|---|---|
| JP | 2000-279295 A | 10/2000 |
| JP | 2005-128138 A | 5/2005 |

* cited by examiner

*Primary Examiner* — Xuan Thai
*Assistant Examiner* — Evan Page
(74) *Attorney, Agent, or Firm* — Michael Crilly, Esq.

(57) ABSTRACT

A wearable wound simulant including a skin replica having the appearance of a particular region of the human body, examples including but not limited to a leg, arm, torso, or stomach, and a wound disposed along the skin replica is described. The skin replica includes a plurality of bendable layers arranged to replicate the visual and tactile properties of human tissues and at least one tear resistant layer comprised of a fabric material disposed between two bendable layers. The tear resistant layers are less stretchable than the bendable layers so as to prevent the bendable layers from stretching beyond their failure threshold. Design elements of the present invention facilitate the visual, tactile, and functional aspects of a battlefield wound so as to allow for the diagnosis of injuries associated therewith. Furthermore, the present invention allows for the insertion of a needle or the like, the probing and/or packing of wounds, the compression of vascular simulants to stop or limit blood loss, and the replacement of dislodged organs.

20 Claims, 16 Drawing Sheets

WEARABLE WOUND SIMULANT

FEDERALLY SPONSORED RESEARCH AND DEVELOPMENT

This invention was made with Government support under Contract No. N61339-07-C-0038 awarded by the U.S. Army Research, Development, and Engineering Command, Simulation and Training Technology Center. The Government may have certain rights in one or more forms of the invention.

CROSS REFERENCE TO RELATED APPLICATIONS

None.

BACKGROUND OF THE INVENTION

1. Field of the Invention

The present invention generally relates to a device capable of simulating a battlefield wound for training purposes. Specifically, the invention includes a plurality of bendable layers disposed about a fabric layer to form a self-sealing structure. Fabric layer constrains the bendable layers so as to avoid stretch conditions which exceed the failure threshold of the bendable layers. The device includes a three-dimensional structure which replicates the appearance and functionality of an impact, penetration, or blast induced injury.

2. Background

The survivability of a wounded soldier has never been better due in large part to improvements in the field of medical treatment, including treatment by non-medical personnel. The medical treatment skills of soldiers are developed by intensely realistic training sessions during which actors wear makeup and/or vinyl devices which replicate the appearance of horrific, life-threatening wounds.

Makeup includes the application of compositions onto the skin of an actor. This approach to simulating a wound has several deficiencies. For example, the application process can be quite lengthy depending on the severity of a wound and the degree of detail desired. Also, the appearance achieved with makeup degrades over time and with use. Furthermore, the visual rather than functional aspect of makeup limits training to a recitation of treatment steps by a trainee. Accordingly, makeup lacks the realism required to properly train non-medical personnel and is not conducive to training sessions involving many different wound types and/or multiple trainees.

Vinyl devices are molded elements which partially conform to a particular body region and superficially represent a wound. Typically, paint is applied to the surface of such devices to enhance and supplement their overall appearance. Accordingly, presently known devices suffer from a wide variety of deficiencies related to appearance, functional realism, and teaching value.

From an appearance perspective, presently known devices do not accurately replicate the visual properties of tissues and bone. Such devices are attached to an actor via straps which are secured to the device via rivets, which eventually tear free from the device. Also, the appearance of such devices degrades over time as paint flakes off the device and nicks, cuts, and tears compromise the shape and integrity thereof. Furthermore, such devices lack the elasticity to properly conform to the human body. Finally, such devices do not completely surround a body region, but rather contact a small portion thereof.

From a functional perspective, presently known devices do not accurately replicate the tactile properties, namely, softness, hardness, compressibility, pliability, resiliency, flexibility, bendability and/or elasticity, of tissues and bone. Also, the construction of such devices precludes functional realism, including the replication of seeping-type wounds and the probing and/or packing of wounds. Furthermore, vascular elements are simulated with rigid tubes which do not replicate the compressibility of vascular structures.

In terms of teaching value, presently known devices simulate the wound only and therefore do not provide a clinically accurate representation of a vascular system adjacent thereto, which is sometimes required for the holistic treatment of an injury. Also, the two-dimensional nature of such devices does not enable a student to probe and pack a wound. Furthermore, such devices preclude the use of needles and the like because resultant holes compromise the integrity of the device. Finally, such devices lack moving parts to replicate internal organs dislodged from a wound.

As is readily apparent from the discussions above, the related arts do not include a wearable wound simulant which replicates the visual, tactile, and functional aspects of battlefield wounds and the tissues and structures adjacent thereto.

Accordingly, what is required is a wearable wound simulant capable of replicating such properties so as to facilitate a realistic medical training tool.

SUMMARY OF THE INVENTION

An object of the invention is to provide a wearable wound simulant capable of replicating the visual, tactile, and functional aspects of a wound and tissues and structures adjacent thereto so as to facilitate a realistic medical training tool.

In accordance with an embodiment of the invention, the wearable wound simulant includes a skin replica having the appearance of a particular region of the human body, examples including, but not limited to, a leg, arm, torso, or stomach, and at least one wound disposed along the skin replica. The skin replica further includes a plurality of bendable layers arranged to replicate visual and tactile properties of skin and at least one tear resistant layer comprised of a fabric material disposed between a pair of bendable layers. The tear resistant layers are less stretchable than the bendable layers so as to prevent the bendable layers from stretching beyond their failure threshold.

In other embodiments, the skin replica could include pigments to replicate a bruise or burn.

In yet other embodiments, the wound simulant could include an object having the visual and tactile properties of a bone with or without a fracture.

In still other embodiments, the wound simulant could include a fastener system comprised of a two-piece hook-and-loop device or a zipper to secure the wound simulant onto a user.

In further embodiments, the present invention could include elements which enhance functionality. Accordingly, the skin replica could be self-sealing so as to allow for the insertion of a needle or the like without compromising the integrity of the simulant. The wearable wound simulant could include one or more tubes, replicating the resiliency of vascular elements, disposed between a pair of tear resistant layers. The wearable wound simulant could include at least one reservoir disposed along or within a skin replica and capable of storing a fluid simulating blood or other body fluid. The reservoir and adjacent wound structure could produce the appearance of a bleeding wound either when pressure within the reservoir reaches a threshold value or when pressure is applied onto the wound. The wearable wound simulant could also include a penetration cavity which extends beyond the skin replica. The wearable wound simulant could also include an object representative of an internal organ that protrudes from a wound.

Several advantages are offered by the described invention. The invention facilitates visual, tactile, and functional aspects of a battlefield wound facilitating the diagnosis of injuries and implementation of treatments. The invention facilitates the simulation of various bleed conditions, including, but not limited to, gushing, spurting and seeping. The invention facilitates treatment of a wound including the insertion of a needle or the like, the probing of wounds, the packing of wounds, the compression of vascular elements to prevent or limit blood loss, and the replacement of dislodged organs and the like.

| REFERENCE NUMERALS |
| --- |
| 1 Skin replica |
| 2 Highlight layer |
| 3 Highlight layer |
| 4 Base layer |
| 5 Fabric layer |
| 6 Backup layer |
| 7 Depth layer |
| 8 Pigment layer |
| 9 Elastic material |
| 10 Needle |
| 11 Cavity |
| 12 Bone replica |
| 13 Cavity |
| 14 Arm simulant |
| 15 Fracture |
| 16 Internal layer |
| 17 Force |
| 18 Elastic deflection |
| 19 Leg simulant |
| 20 Fastener system |
| 21 Stitching |
| 22 Arm simulant |
| 23 Fastener system |
| 24 Fabric layer |
| 25 Supply tube |
| 26 Wound |
| 27 Resilient opening |
| 28 Blood simulant |
| 29 Supply tube network |
| 30 Reservoir |
| 31 Surface |
| 32 Patch |
| 33 Cavity |
| 34 Torso simulant |
| 35 Wound |
| 36 Wound cavity |
| 37 Stomach simulant |
| 38 Wound |
| 39 Object |
| 40 Cavity |
| 41 Fastener system |
| 42 Seam |
| 43 Leg |
| 44 Thigh |
| 45 Flap |
| 46 Interior surface |

BRIEF DESCRIPTION OF THE DRAWINGS

The invention will now be described in more detail, by way of example only, with reference to the accompanying drawings, in which:

FIG. 8b is a cross-sectional perspective view illustrating the elastic behavior of the skin replica shown in FIG. 8a.

DETAILED DESCRIPTION OF THE INVENTION

The present invention is understood to include a multi-layered structure, referred to as a skin replica 1, and at least one wound 26, 35, or 38 disposed thereon, as described in detail herein. The present invention is described with specific reference to applications involving an arm, leg, torso, and stomach; however, it is understood that the present invention is likewise applicable to other regions of a human body. Wounds 26, 35, or 38 are also understood to mean a structure representative of an injury caused by a penetration, impact, blast, fire, or other combat-related wound. The invention described herein is preferred to completely surround and cover the body region which it replicates.

Figure 1:
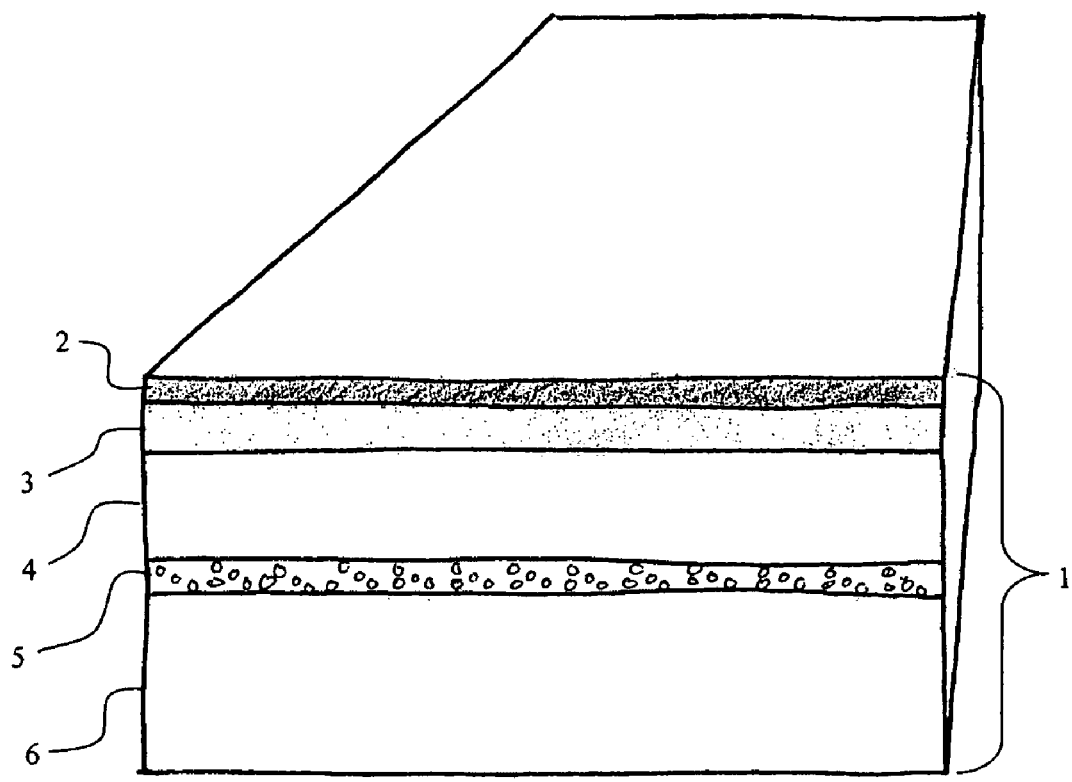
FIG. 1 is a cross-sectional perspective view illustrating construction of a skin replica in accordance with an embodiment of the present invention.

Referring now to FIG. 1, one embodiment of the skin replica 1 is a multi-layered structure including a pair of highlight layers 2, 3, a base layer 4, a fabric layer 5, and a backup layer 6 arranged and contacting in the order described. Highlight layers 2, 3, base layer 4, and backup layer 6 are each composed of one or more silicone-based polymers, either translucent or transparent, which are flexible, stretchable, compressible and resilient. Low durometer or soft silicones are preferred. The fabric layer 5 is a woven structure or the like, which is flexible, stretchable, and resilient, composed of natural or synthetic fibers, one example being polyester.

Figure 2:
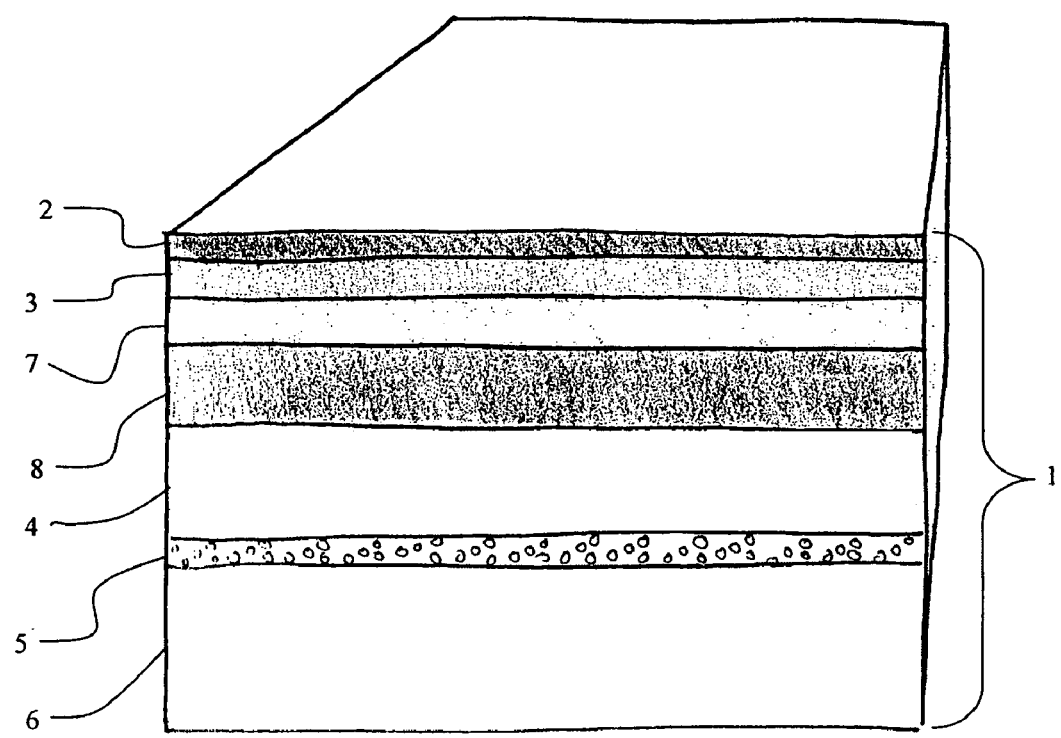
FIG. 2 is a cross-sectional perspective view illustrating construction of a skin replica with bruising effect in accordance with an embodiment of the present invention.

Referring now to FIG. 2, another embodiment of the skin replica 1 is a multi-layered structure including a pair of highlight layers 2, 3, a depth layer 7, a pigment layer 8, a base layer 4, a fabric layer 5, and a backup layer 6 arranged and contacting in the order described. The highlight layers 2, 3 depth layer 7, pigment layer 8, base layer 4, and backup layer 6 are each composed of one or more silicone-based polymers, either translucent or transparent, which are flexible, stretchable, compressible, and resilient. The fabric layer 5 is a woven structure or the like, which is flexible, stretchable, and resilient, composed of natural or synthetic fibers.

The color and overall appearance of human skin is the product of dermal layers with different translucent qualities, as well as, the visualization of veins, bruises, bleeding, and other structures below or within the dermal layers. The skin replica 1 replicates or approximates the visual characteristics of human skin via the layered arrangement of polymer layers, each including one or more pigment compositions. The visual characteristics of the highlight layers 2, 3, base layer 4, backup layer 5, depth layer 7, and/or pigment layer 8 interact to produce the color, translucence, and texture of human skin.

The highlight layers 2, 3 are the outermost or exterior layers of the skin replica 1. One purpose of the highlight layers 2, 3 is to replicate the flesh tones of skin. Each highlight layer 2, 3 includes at least one pigment compound which replicates the appearance of flesh. For example, each highlight layer 2, 3 could be composed of a translucent silicone polymer with a thickness less than 1 millimeter loaded with a powdered pigment in a mass concentration of less than 1% by weight, however, other thicknesses and concentrations are possible. Pigments are understood to mean commercial powders readily available at an art supply shop or the like.

One purpose of the base layer 4 is to support the highlight layers 2, 3 and fabric layer 5. The base layer 4 could be composed of a translucent silicone polymer with a thickness of approximately 2 millimeters having a pigment which approximates flesh tones in a mass concentration of less than 1% by weight, however, other thicknesses and concentrations are possible.

One purpose of the backup layer 6 is to further secure the fabric layer 5 to the base layer 4. The backup layer 6 could be composed of a commercially available translucent silicone polymer with a thickness of at least 1 millimeter and optionally loaded with colored pigment, which approximates flesh tones, to a mass concentration of less than 1% by weight, however, other thicknesses and concentrations are possible.

One purpose of the depth layer 7 is to enhance the depth characteristics of the pigment layer 8 so as to give the appearance of an internal injury. The depth layer 7 could be composed of a translucent silicone polymer with a thickness of approximately 1.5 millimeters, although the thickness is application dependent, loaded with optional flesh tone colored pigments to a mass concentration of less than 1% by weight, however, other thicknesses and concentrations are possible.

One purpose of the pigment layer 8 is to replicate the appearance of an internal injury, examples including but not limited to bruising or bleeding. The pigment layer 8 could be composed of a translucent silicone polymer with a thickness from 1 to 2 millimeters and loaded with optional flesh colored pigments in a mass concentration of at least 3% by weight; however, other thicknesses and concentrations are possible. The intensity of the pigment layer 8 is inversely related to the thickness of the depth layer 7, which is adjusted to achieve the desired appearance.

The fabric layer 5 prevents overstretching of the skin replica 1 beyond the threshold at which the skin replica 1 fails and ensures closure of punctures and/or holes along the skin replica 1. The fabric layer 5 is preferred to be a woven structure or to have a plurality of holes therein to ensure impregnation by silicone polymers comprising the base layer 4 and backup layer 6. The fabric layer 5 could be a translucent, transparent, or colored material which enhances the skin-like appearance of a skin replica 1.

Figure 3:
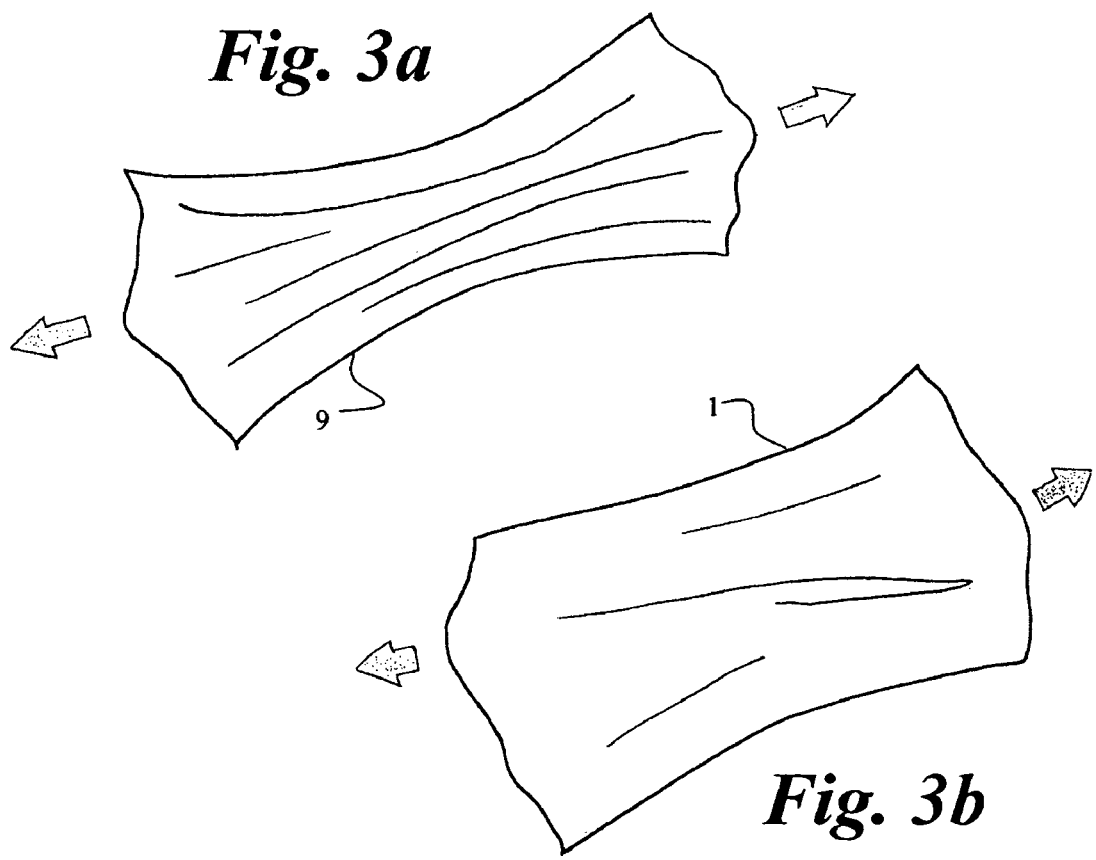
FIG. 3a is a top view illustrating the stretch behavior of an exemplary elastic material.
FIG. 3b is a top plan view illustrating the stretch behavior of a skin replica in accordance with the present invention.

Referring now to FIG. 3a, a multi-layered elastic structure 9 is graphically represented in a stretched condition. Elastic structures 9 composed of silicone polymers and the like stretch until either a tear or delamination results. Failure occurs when the stretch exceeds the elastic limit of one or more layers in the structure. In the present invention, the fabric layer 5 constrains or limits the degree of stretch otherwise allowable along the structure, as graphically represented in FIG. 3b for an exemplary skin replica 1. Accordingly, the maximum stretch length of the fabric layer 5 should be less than the stretch length at which a failure would occur within one or more polymers comprising a skin replica 1.

The insertion of a needle and intravenous line are critical to the treatment of battlefield wounds. Accordingly, it is desired for a skin replica 1 to allow a trainee to puncture the simulant without irreparably damaging the device.

Figure 4:
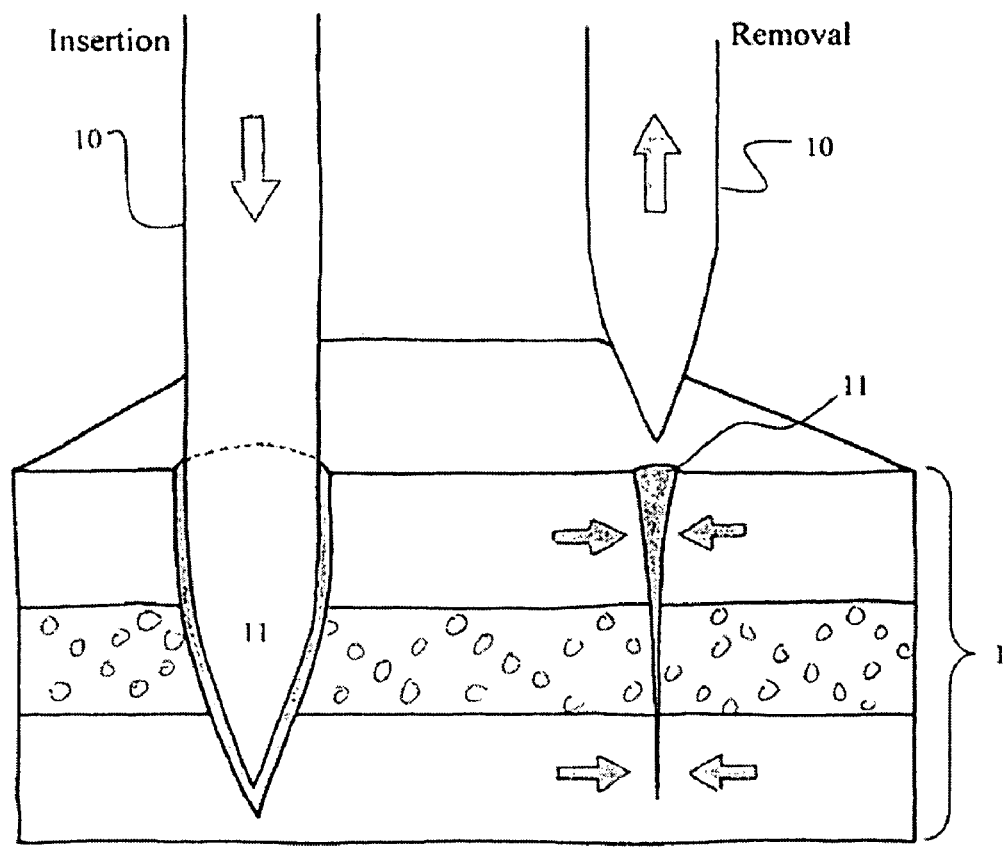
FIG. 4 is cross-sectional perspective view illustrating the self-sealing behavior of a skin replica in accordance with an embodiment of the present invention.

Referring now to FIG. 4, an exemplary self-sealing skin replica 1 is shown before and after perforation by a needle 10. The layered construction of polymers and fabric, as described herein, enables the skin replica 1 to deform when penetrated by a needle 10 so as to form a cavity 11, much like the response of human tissues. Upon removal of the needle 10, the elastic properties of the polymers and fabric cause the cavity 11 to collapse or close, much like human tissues, to nearly at least the original condition of the skin replica 1.

While subsequent stretching of the skin replica 1 could cause the cavity 11 to reopen in a limited fashion, the cavity 11 does not initiate a tear because of the constraining properties of the fabric layer 5. Furthermore, the fabric layer 5 prevents punctures and tears from propagating along the skin replica 1.

The following is exemplary of one method used to fabricate a skin replica 1. Fabrication of a skin replica 1 includes the layered application of one or more silicone polymers and fabric sheets. One or more polymers with the same, similar, or different flexibility, stretchability, compressibility, and/or resiliency characteristics could be used to replicate the compressibility and elasticity of skin within a particular region of a body. The bond between two polymer layers is preferred to be a chemical or adhesive bond at least as strong as the weakest polymer.

First, liquid-based silicone polymers are blended and mixed with powdered pigments to achieve the desired balance between translucency and color. Next, a pigmented silicone polymer is applied via a brush onto a planar or non-planar mold, textured to replicate a body part, and cured at room temperature to form the first highlight layer 2. The mold could include one or more structures which form a hole or cavity into one or more layers of the skin replica 1 to replicate tissues compromise d by a projectile, shrapnel, blast, burn, or the like. Next, a pigmented silicone polymer is applied onto the first highlight layer 2 and cured at room temperature to form a second highlight layer 3. Next, a pigmented silicone polymer is applied onto the second highlight layer 3 forming a base layer 4 and thereafter a fabric layer 5 is applied to the base layer 4 before the base layer 4 cures. Thereafter, the base layer 4 is cured at room temperature. Next, a pigmented silicone polymer is applied onto the fabric layer 5 so as to fully impregnate the fabric with polymer. Thereafter, the polymer is cured at room temperature.

In some embodiments, a depth layer 7 and pigment layer 8 may be required. The depth layer 7 is applied as a layer of pigmented silicone polymer to the second highlight layer 3 and thereafter cured at room temperature. Next, a pigmented silicone polymer is applied to the depth layer 7 to form a pigment layer 8 and cured at room temperature. Thereafter, base layer 4, fabric layer 5, and backup layer 6 are applied as described herein.

After the last applied layer is cured, the skin replica 1 is removed from the mold and edges are trimmed with a knife or shears to remove excess materials. Finally, an optional seam is cut into the skin replica 1. In some embodiments, the layup of layers could be performed along a planar-shaped mold, thus avoiding the cutting step to form a seam.

Figure 5A:
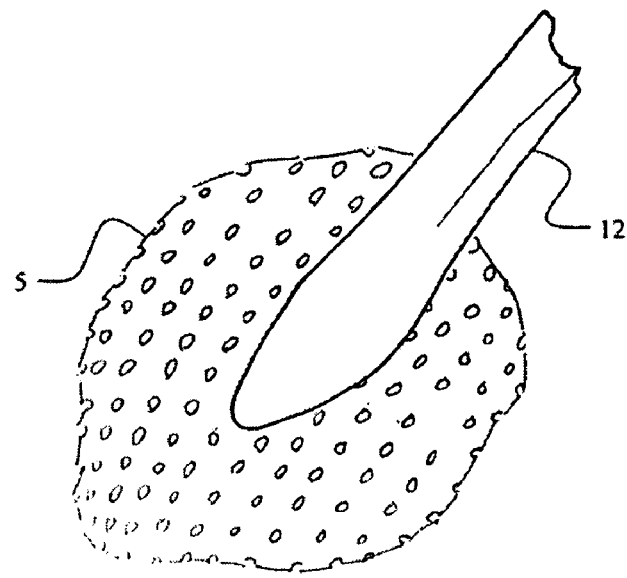
FIG. 5a is a perspective view illustrating the attachment of a bone replica to a tear resistance fabric in accordance with a preferred embodiment of the present invention.
Figure 5B:
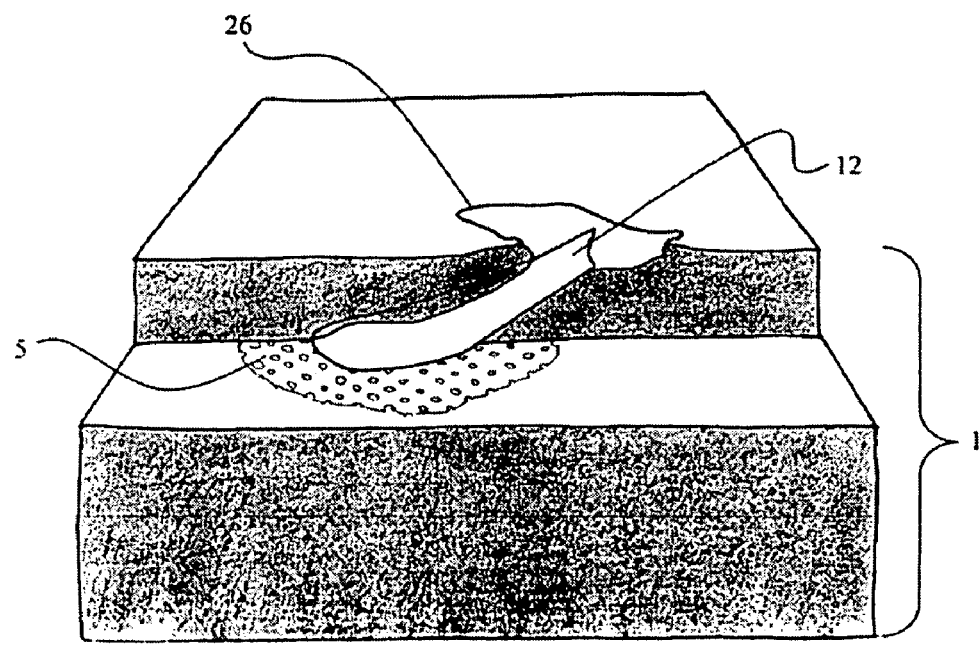
FIG. 5b is a perspective view with partial cross section illustrating attachment of the bone replica and tear resistant fabric layer shown in FIG. 5a to a skin replica in accordance with an embodiment of the present invention.

In some embodiments, a bone replica 12 could be required to simulate a wound 26. Referring now to FIG. 5a, a bone replica 12, exemplary of a bone which has fractured or otherwise penetrated the tissues adjacent to a wound 26, is shown attached to a fabric layer 5. The bond replica 12 could be composed of a hard cast resin, one example being urethane, shaped to replicate the appearance, pigmented to replicate the color as described herein, and composed of a composition to replicate the hardness of a bone. In some embodiments, the bone replica 12 is disposed along and/or about a portion of a fabric layer 5 and cured so as to bond or mechanically attach the two elements. Thereafter, the fabric layer 5 with attached bone replica 12 is applied between a base layer 4 and backup layer 6, as described herein, so as to mechanically lock the bone replica 12 to the skin replica 1. Further, the bone replica 12 could protrude from a skin replica 1, as represented in FIG. 5b, within a cavity, hole, or opening along the skin replica 1 representative of a penetration, blast, or impact type wound 26.

Figure 6A:
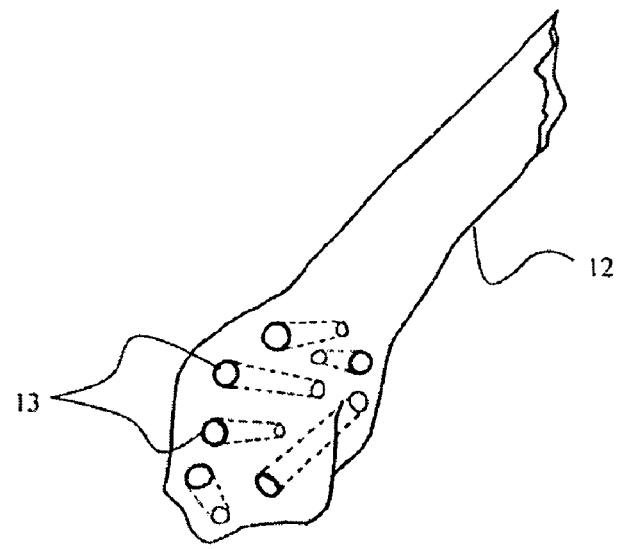
FIG. 6a is a perspective view illustrating a plurality of cavities within a bone replica.
Figure 6B:
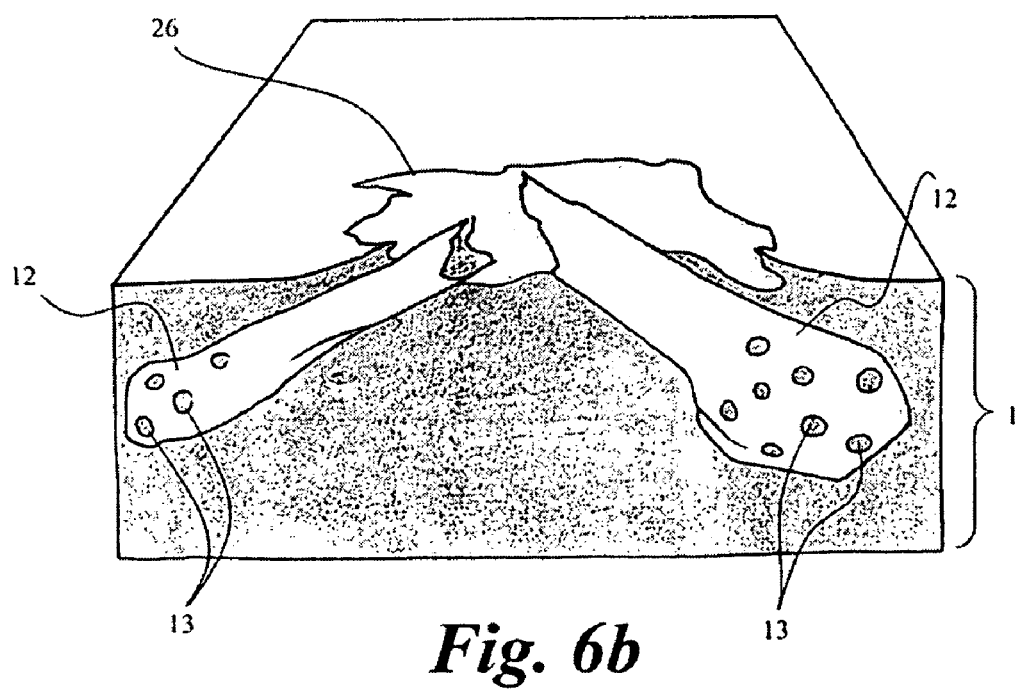
FIG. 6b is a perspective view with partial cross section illustrating attachment of the bone replica shown in FIG. 6a to a skin replica in accordance with an embodiment of the present invention.

Referring now to FIG. 6a, other embodiments of the invention could include a bone replica 12 having one or more cavities 13 along the bone structure. Cavities 13 could be molded into the bone replica 12 during fabrication or mechanically drilled into the item after the resin structure has properly cured. Cavities 13 enable attachment of the bone replica 12 to the skin replica 1, as represented in FIG. 6b. In these embodiments, the bone replica 12 is positioned within one or more silicone polymer layers prior to cure so as to allow the polymer to fill each cavity 13. Thereafter, the polymer is cured so as to mechanically lock the bone replica 12 onto the skin replica 1.

Figure 7:
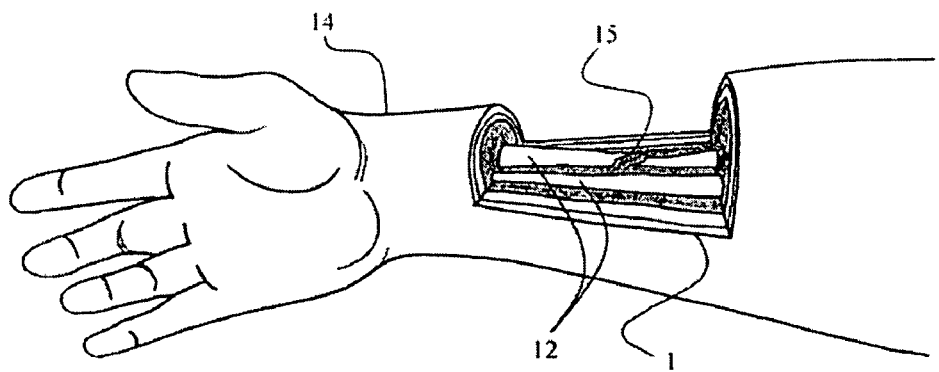
FIG. 7 is a partial sectional view illustrating a bone fracture within an arm simulant in accordance with an embodiment of the present invention.

Referring now to FIG. 7, an exemplary arm simulant 14 is shown including two or more bone replicas 12 enclosed within, rather than protruding from, a skin replica 1. One or more bone replicas 12 could include a fracture 15 or break exemplary of an internal injury. The skin replica 1 is composed of silicone polymers which mimic the tissues about a fracture 15 so as to allow a trainee to develop the skills required to identify and diagnose a concealed bone injury.

Figure 8A:
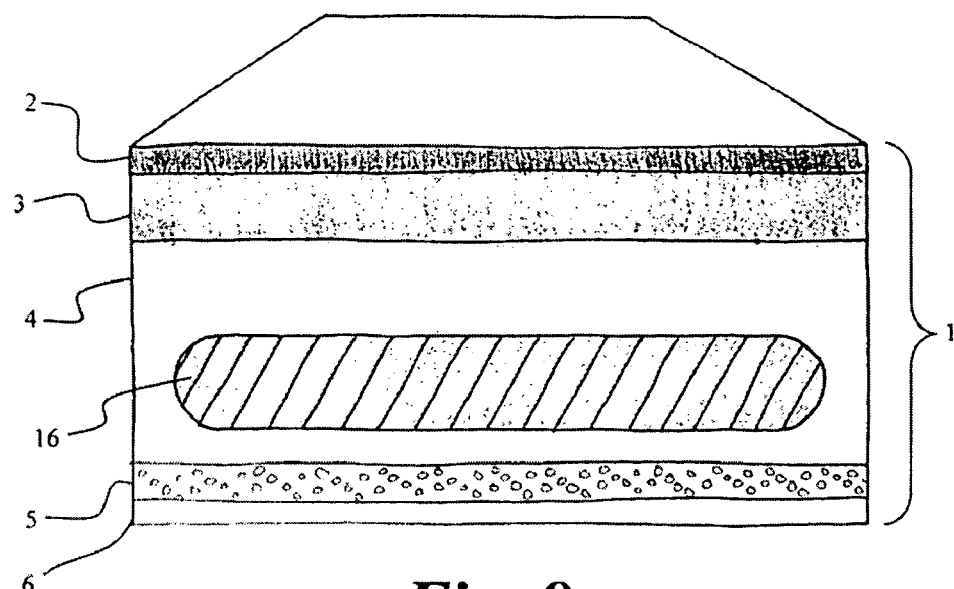
FIG. 8a is a cross-sectional perspective view illustrating construction of a skin replica with optional internal layer in accordance with an embodiment of the present invention.
Figure 8B:
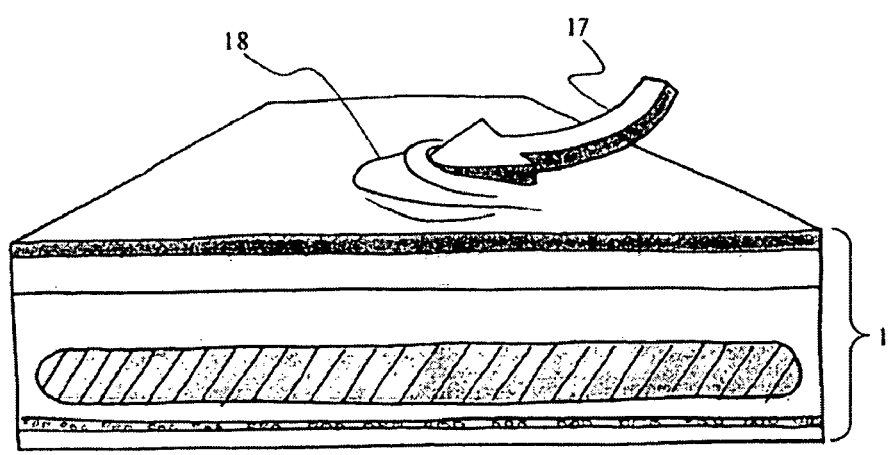

Referring now to FIG. 8a, it might be advantageous in some embodiments to include an internal layer 16 within a skin replica 1 to approximate the properties of fat, muscle, bones, or internal organs. The internal layer 16 could be composed of a silicone polymer which is softer or harder and/or less or more compressible than the highlight layers 2, 3, base layer 4, backup layer 6, depth layer 7, and/or pigment layer 8, which otherwise comprise a skin replica 1. For example, the internal layer 16 could be positioned within the skin replica 1 so that the uppermost layers, namely, highlight layers 2, 3, slough or exhibit an elastic deflection 18 much like skin does over muscle when a force 17 is applied thereto. In preferred embodiments, the internal layer 16 should be enclosed within a base layer 4 and substantially parallel to the highlight layers 2, 3, as represented in FIG. 8b, although other arrangements are possible.

Figure 9A:
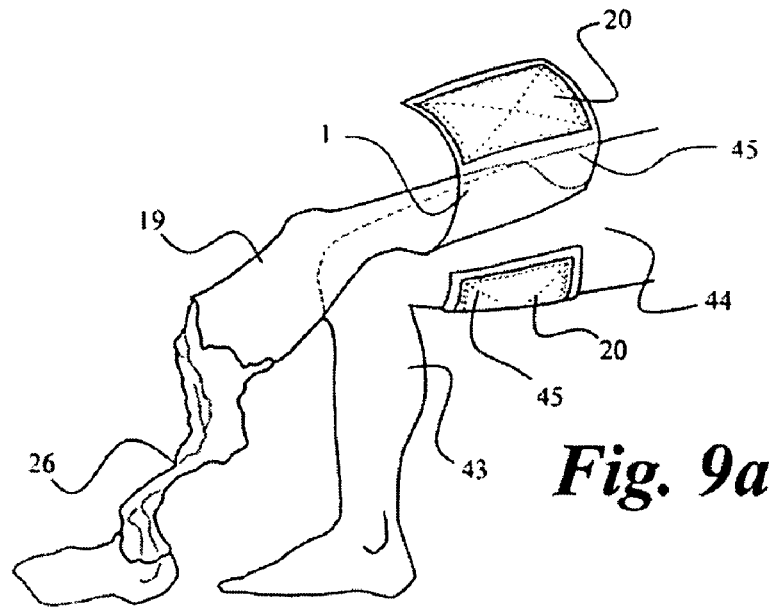
FIG. 9a is a side elevation view illustrating attachment of a leg simulant in accordance with a preferred embodiment of the present invention.
Figure 9B:
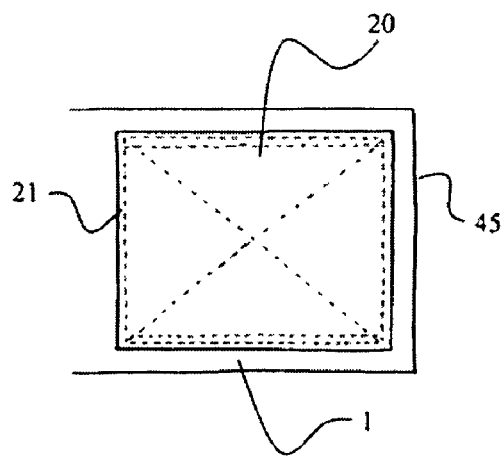
FIG. 9b is a top plan view illustrating attachment of hook-and-loop fasteners to a skin replica.
Figure 9C:
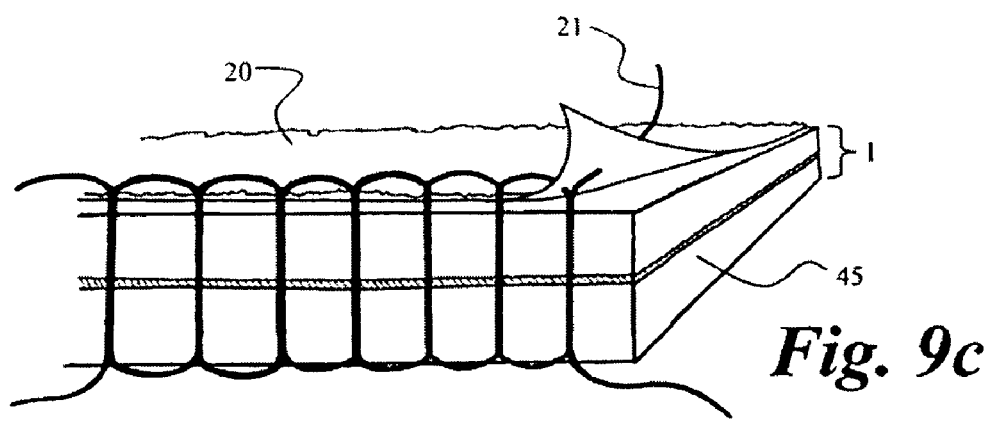
FIG. 9c is perspective view illustrating attached of hook-and-loop fasteners to a skin replica.

Referring now to FIG. 9a, a leg simulant 19 is shown including a wound 26 at one end and a pair of flaps 45 disposed at another end. Flaps 45 could be composed of one or more layers of a skin replica 1 along the leg simulant 19. The flaps 45 extend from the leg simulant 19 so as to encircle the body part onto which the simulant is applied. A fastener system 20 is attached to the flaps 45, as represented in FIGS. 9b and 9c. In preferred embodiments, the fastener system 20 could include a two piece hook-and-loop device, one example being Velcro®, so that the loop component of the system is attached to one flap 45 and the hook component is attached to the other flap 45. The fastener system 20 could be attached to the flaps 45 via stitching 21, as represented in FIGS. 9b and 9c. In preferred embodiment, the stitching 21 is placed about the perimeter of each fastener element and along two diagonals in an intersecting pattern. The leg simulant 19 could be attached to an actor's leg 43 by encircling the actor's thigh 44 with the flaps 45 and securing the two-piece fastener system 20 thereto, as represented in FIG. 9a. The described attachment structure is likewise applicable to other simulants and replicas described herein.

Figure 10A:
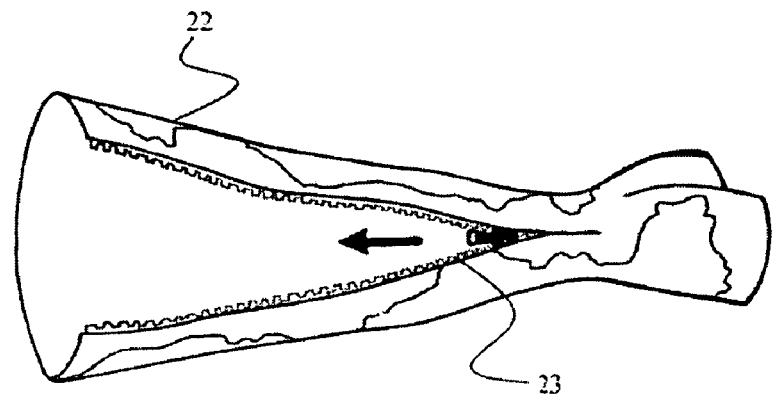
FIG. 10a is a side elevation view illustrating construction of an arm simulant with zipper mechanism in accordance with a preferred embodiment of the present invention.
Figure 10B:
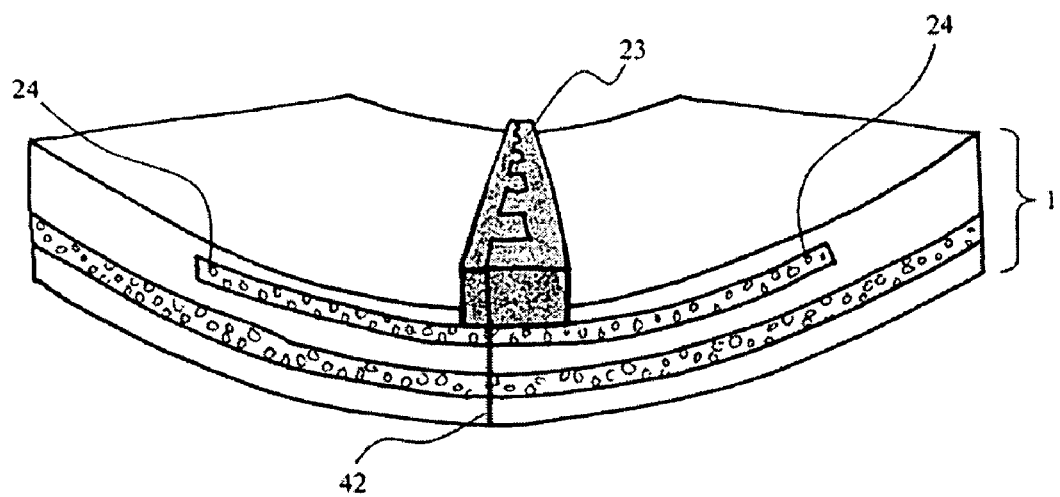
FIG. 10b is a cross-sectional perspective view illustrating attachment of a zipper to a skin replica.

Referring now to FIGS. 10a and 10b, a closable fastener system 23, one example being a zipper, could be provided along the length of an arm simulant 22 to secure it onto an actor. The two-piece fastener system 23 could be attached to the arm simulant 22 by embedding a pair of fabric layers 24 within a skin replica 1, along the arm simulant 22, about a seam 42. For example, the individual pieces of the fastener system 23 could be adhesively bonded or mechanically attached via stitching to separate fabric layers 24. Thereafter, the fabric layers 24 could be embedded between two polymer layers as described herein. A cover or the like could be placed along the length of the fastener system 23 to conceal it from view. The described attachment structure is likewise applicable to other simulants and replicas described herein.

Figure 11A:
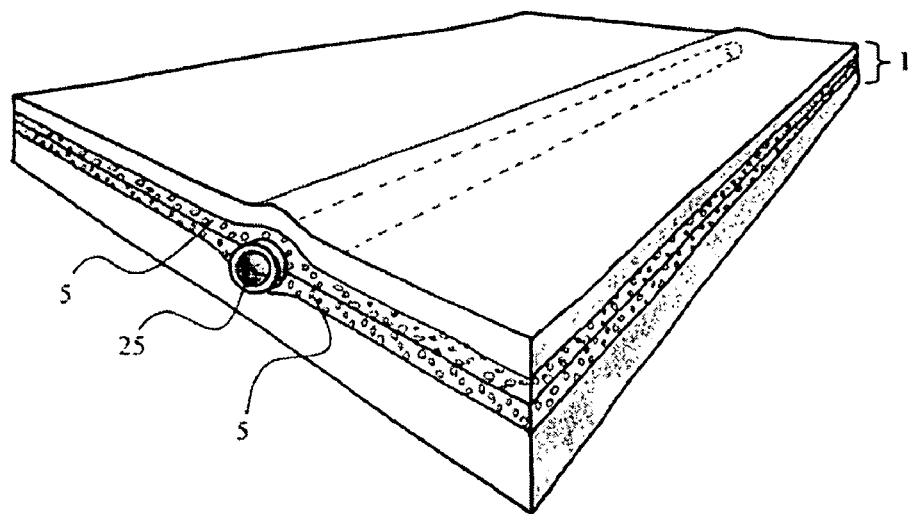
FIG. 11a is a cross-sectional perspective view illustrating attachment of a deformable tube within a skin replica in accordance with a preferred embodiment of the present invention.
Figure 11B:
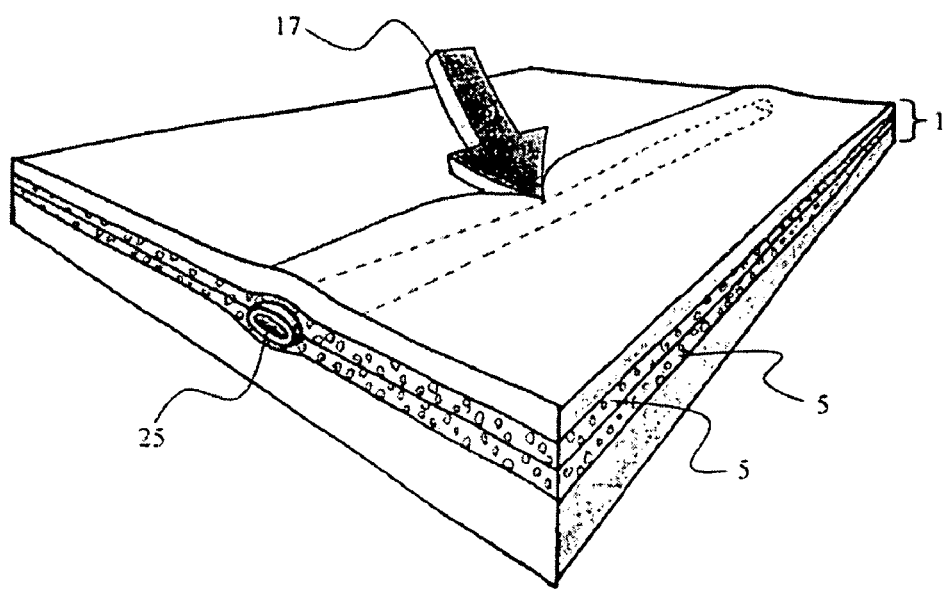
FIG. 11b is a cross-sectional perspective view illustrating deflection of a deformable tube within a skin replica in response to an applied force.

Referring now to FIGS. 11a and 11b, a supply tube 25, replicating the functionality of a vein, artery, or other vascular structure, could be embedded within a skin replica 1. The incorporation of tubes within a multi-layered polymer structure is problematic in that tubes do not bond well with polymers. In the present invention, two fabric layers 5 are disposed about a supply tube 25. The fabric layers 5 are impregnated with a silicone polymer composition so as to bond with the fabric layers 5, rather than directly with the supply tube 25. In preferred embodiments, the supply tube 25 is a compressible, translucent tube disposed between a base layer 4 and a backup layer 6 so as to allow deflection thereof when a force 17 is applied by a tourniquet or the like, as represented in FIG. 11b. The supply tube 25 could also include coloring consistent with human tissues.

Figures 12A, 12B:
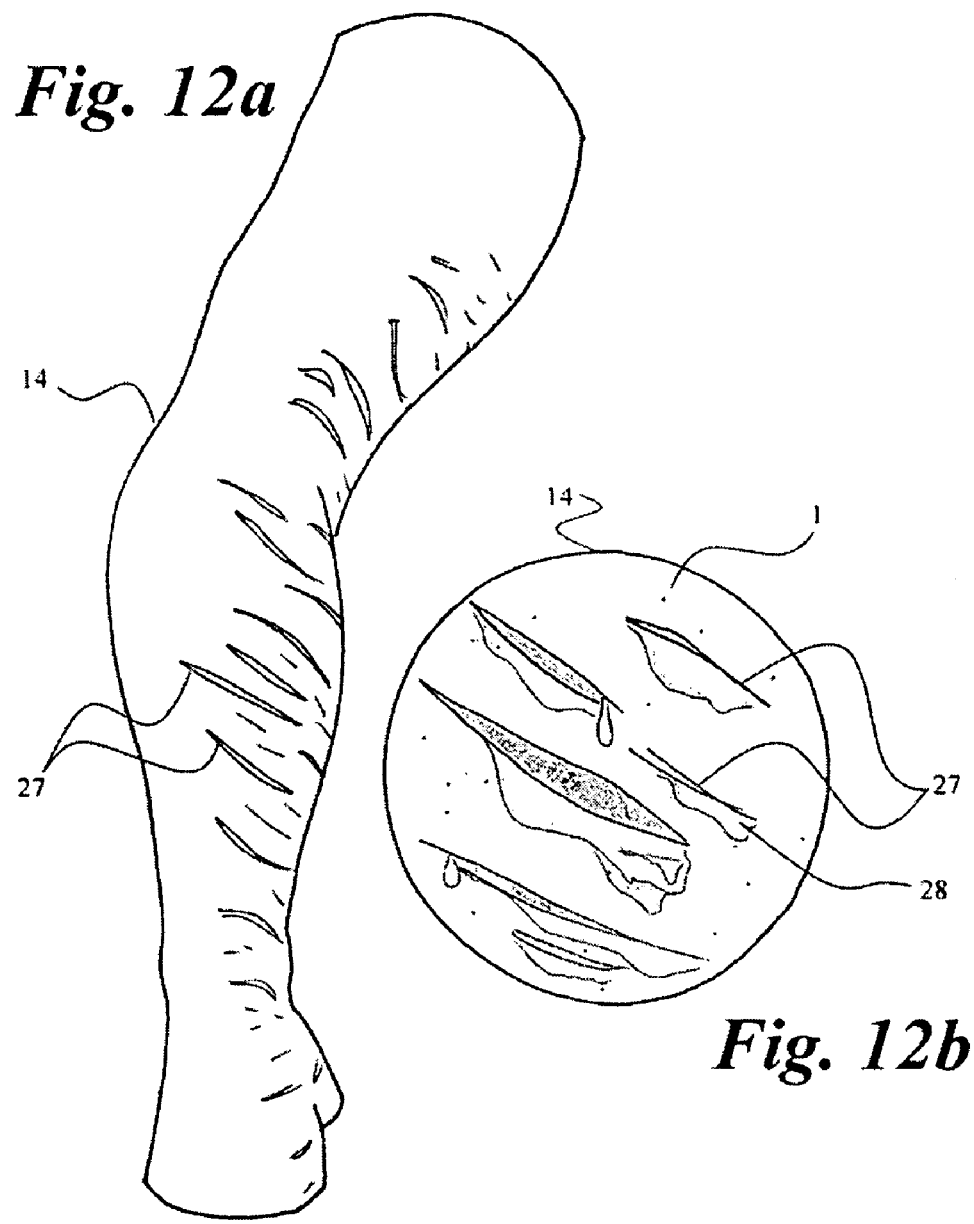
FIG. 12a is a side elevation view illustrating an arm simulant with a plurality of seeping-type wounds in accordance with an embodiment of the present invention.
FIG. 12b is an enlarged view of the arm simulant shown in FIG. 12a illustrating blood loss from seeping-type wounds.

Referring now to FIGS. 12a and 12b, an arm simulant 14 is shown including a plurality of resilient openings 27 replicating a wound from which a blood simulant 28 seeps, rather than spurts or gushes. Each resilient opening 27 is comprised of a slit or pinhole which traverses some or all layers within a skin replica 1. The self-sealing property of the skin replica 1 could prevent the blood simulant 28 from passing through the resilient openings 27 under certain conditions.

Figure 13:
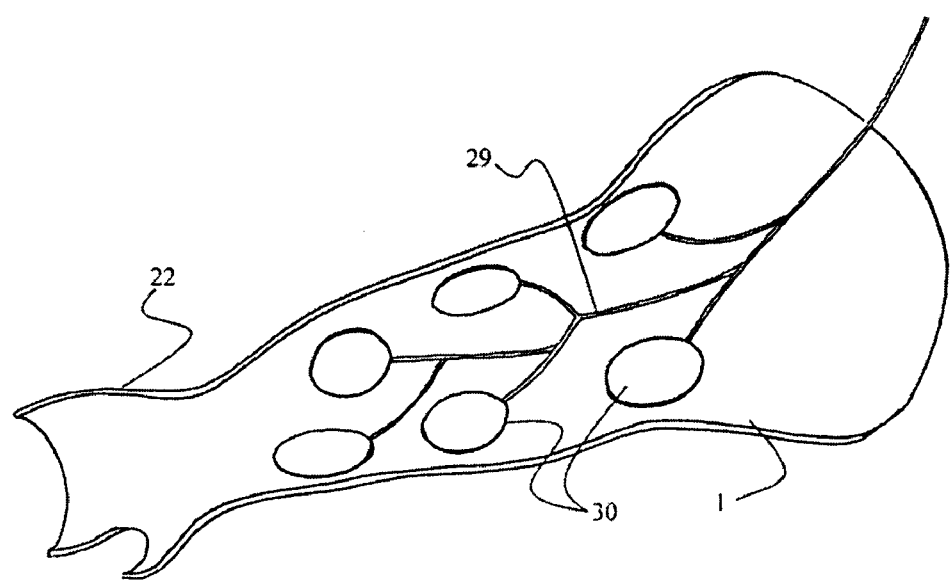
FIG. 13 is a cross-sectional perspective view of the interior of an arm simulant illustrating a network of supply tubes and reservoirs in accordance with an embodiment of the present invention.

Referring now to FIG. 13, a plurality of reservoirs 30 are shown attached to and communicating with a supply tube network 29 along an exemplary arm simulant 22. One end of the supply tube network 29 is attached to a manual or electric pump or the like so as to communicate blood simulant 28 from a container residing within or separate from the arm simulant 22.

A reservoir 30 is understood to be a cavity capable of temporarily storing a blood simulant 28. Each reservoir 30 is disposed along the structure of the skin replica 1 so as to communicate with one or more resilient openings 27. Reservoirs 30 are formed by placing a silicone patch 32 or the like, preferably with flesh tone pigments, onto the base layer 4 or backup layer 6 of a skin replica 1 and at least one tube within a supply tube network 29. Thereafter, the periphery of each patch 32 is bonded to the base layer 4 or backup layer 6 and supply tube network 29 via a silicone resin, including optional flesh tone pigments.

Figure 14:
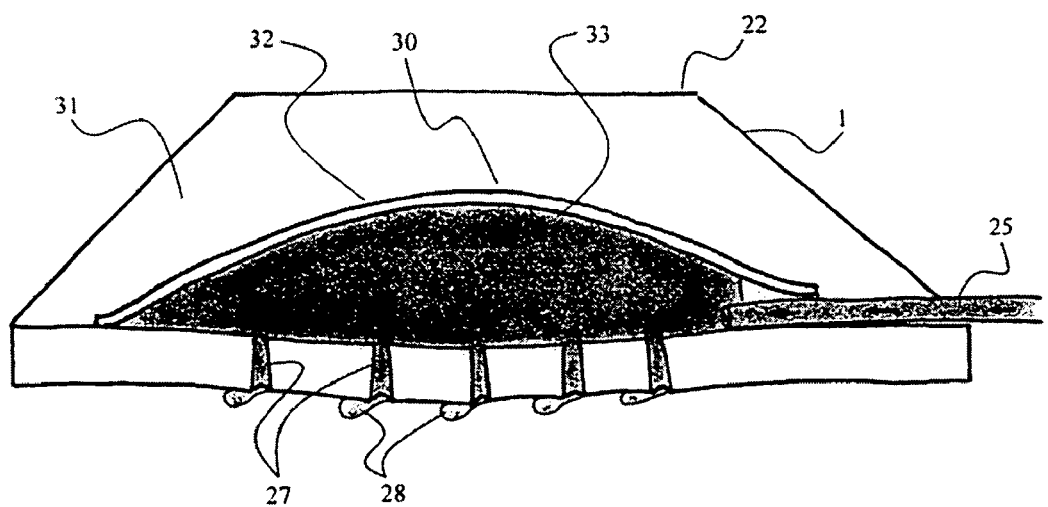
FIG. 14 is a cross-sectional perspective view illustrating construction of a skin replica with bleed structure in accordance with an embodiment of the present invention.

Referring now to FIG. 14, the cavity 33 within a reservoir 30 is shown filled with a blood simulant 28 so that the resilient openings 27 are expanded. The blood simulant 28 passes through or flows from one or more resilient openings 27 when either the pressure exerted by the blood simulant 28 exceeds a threshold value or an actor or trainee applies a force onto the surface 31 adjacent to a resilient opening 27 to negate the self-sealing properties of the skin replica 1.

Figure 15A:
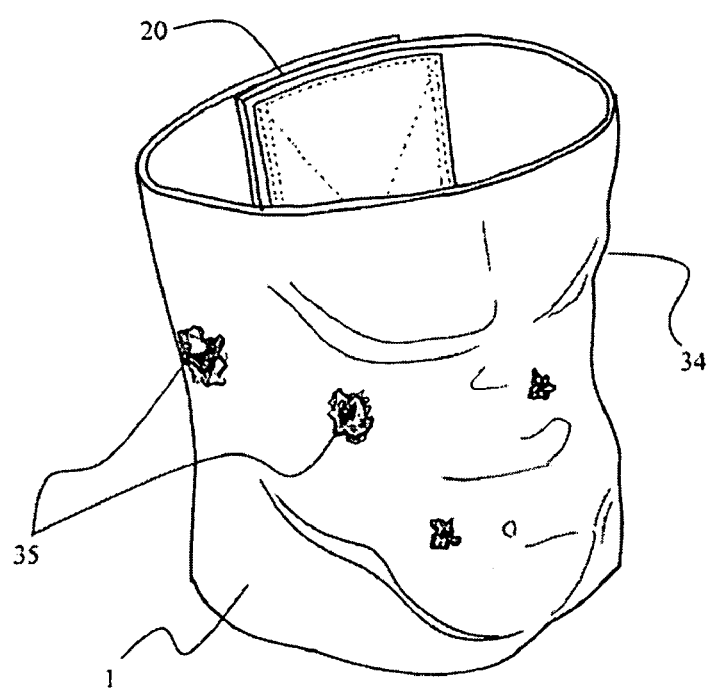
FIG. 15a is perspective view illustrating a torso simulant with a plurality of wounds in accordance with an embodiment of the present invention.
Figure 15B:
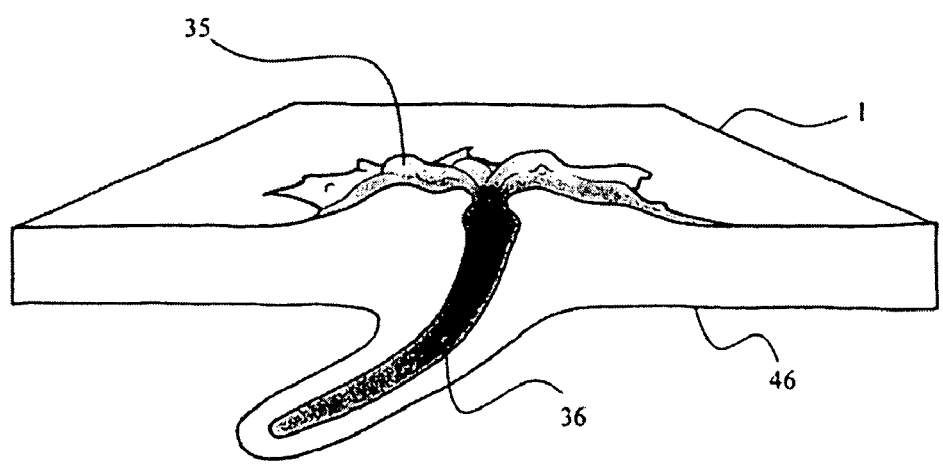
FIG. 15b is a cross-sectional perspective view illustrating a penetration cavity within a skin replica in accordance with an embodiment of the present invention.

Referring now to FIGS. 15a and 15b, a torso simulant 34 with fastener system 20 is shown including a plurality of wounds 35. One or more wounds 35 could include a wound cavity 36 which traverses and extends beyond the skin replica 1. Wound cavities 36 should be sufficiently large and/or expandable so as to allow for the insertion of a finger or probe by a trainee or gauze or other materials used to treat a wound. In preferred embodiments, two wound cavities 36 could be arranged to replicate the entry and exit points produced by a projectile and attached to a supply tube network 29, as described herein. The wound cavity 36 could be fabricated via a complimentary structure residing along a mold allowing for the fabrication of a multi-layer structure, as described herein for a skin replica 1. The mold could be textured so that the wound cavity 36 has the tactile properties associated with a gunshot wound or the like. In some embodiments, a fabric layer 5 could be applied to the interior surface 46 of the skin replica 1 to further resist punctures which might result from probing and packing of a wound cavity 36.

Figure 16A:
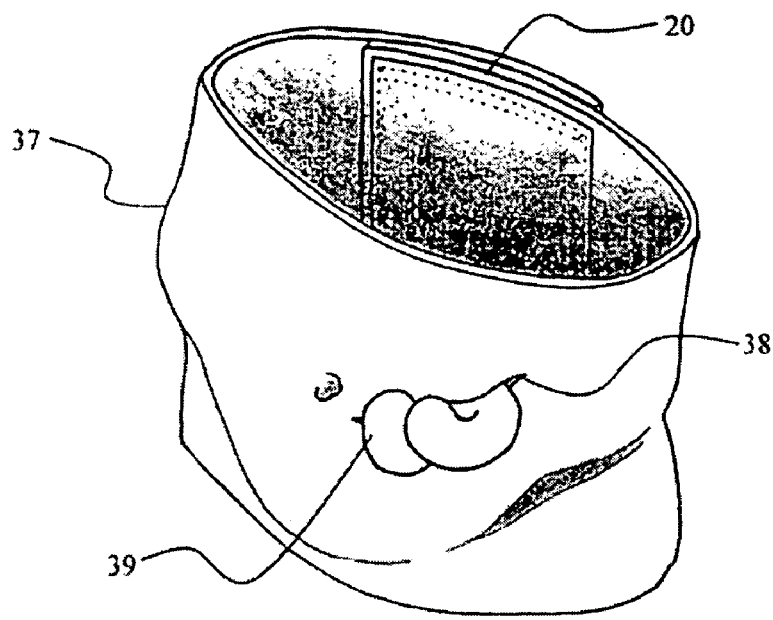
FIG. 16a is a perspective view illustrating a wound with protruding viscera in accordance with an embodiment of the present invention.
Figure 16B:
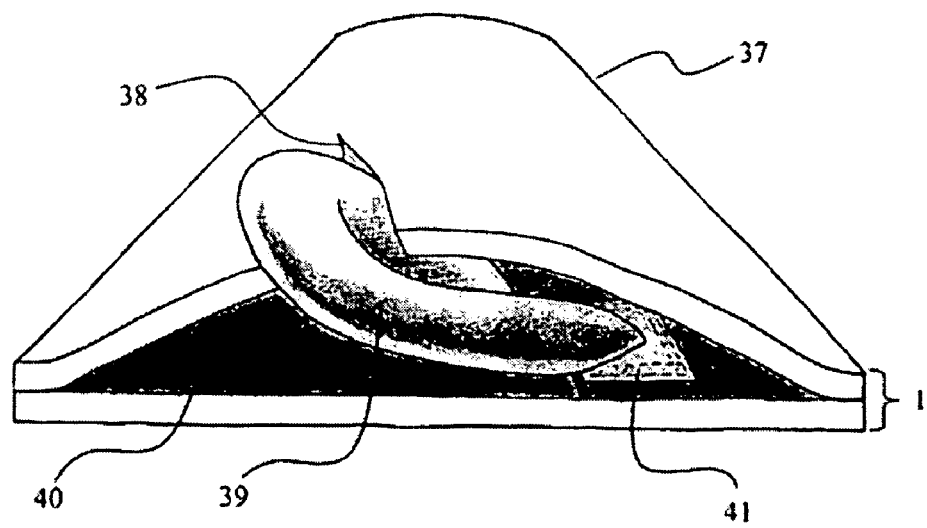
FIG. 16b is a cross-sectional perspective view illustrating attachment of viscera to a skin replica.

Referring now to FIGS. 16a and 16b, a stomach simulant 37 with fastener system 20 is shown with an object 39 extending from a wound 38. The object 39 could represent an internal organ, one example being an intestine, or tissues which are dislodged from a human body. The object 39 could be composed of a pigmented silicone resin replicating the shape, visual, and tactile properties of an internal organ or tissues. The object 39 could be attached to the skin replica 1 via a fastener system 41, one example being a two-piece hook-and-loop device, housed with a cavity 40, as represented in FIG. 16b. In preferred embodiments, the cavity 40 is could be sufficiently voluminous so as to allow for the reinsertion of the object 39 into the skin replica 1 by a trainee. In yet other embodiments, the cavity 40 or object 39 could be attached to a supply tube network 29 and include one or more bleed points, as described herein.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A wearable wound simulant comprising:
   (a) a skin replica having appearance of a region of a human body, said skin replica comprises:
      (i) a plurality of bendable layers arranged to approximately replicate visual and tactile properties of a human tissue; and
      (ii) at least one tear resistant layer comprised of a fabric material disposed between two said bendable layers, said at least one tear resistant layer being less stretchable than elastic limit of one or more said bendable layers so as to prevent failure thereof, said bendable layers and said at least one tear resistant layer forming a self-sealing structure;
   (b) a wound structure disposed along said skin replica; and
   (c) a fastener system attached to said skin replica to secure said wearable wound simulant about said region.

2. The wearable wound simulant of claim 1, wherein at least one said bendable layer is pigmented to give appearance of a bruise or a burn.

3. The wearable wound simulant of claim 1, further comprising:
   (d) an object approximately replicating visual and tactile properties of a bone, said object molded onto said tear resistant layer and disposed within said skin replica so as to partially protrude from said skin replica.

4. The wearable wound simulant of claim 3, wherein said object approximately replicates visual and tactile properties of a fracture.

5. The wearable wound simulant of claim 1, further comprising:
   (d) an object approximately replicating visual and tactile properties of a bone, said object having at least one cavity therein, said object disposed within said skin replica so that at least one said bendable layer fills said at least one cavity, said object partially protruding from said skin replica.

6. The wearable wound simulant of claim 5, wherein said object replicates visual and tactile properties of a fracture.

7. The wearable wound simulant of claim 1, further comprising:
   (d) an object approximately replicating tactile properties of a bone with a fracture disposed within said skin replica.

8. The wearable wound simulant of claim 1, wherein at least one said bendable layer approximately replicates tactile properties of fat, muscle, bone, or internal organ.

9. The wearable wound simulant of claim 1, wherein at least one said bendable layer is softer than at least one other said bendable layer.

10. The wearable wound simulant of claim 1, wherein said skin replica approximates elasticity of skin.

11. The wearable wound simulant of claim 1, wherein said fastener system is a two-piece hook-and-loop device.

12. The wearable wound simulant of claim 1, wherein said fastener system is a zipper device.

13. The wearable wound simulant of claim 1, further comprising:
   (d) at least one tube disposed between two said tear resistant layers, said at least one tube approximating resiliency of a vascular element.

14. The wearable wound simulant of claim 13, wherein a plurality of said tubes form a network having tactile properties of a vascular system.

15. The wearable wound simulant of claim 13, further comprising:
   (e) at least one reservoir disposed along or within said skin replica and capable of storing a fluid approximately replicating appearance of blood.

16. The wearable wound simulant of claim 15, wherein said at least one reservoir communicates with a resilient opening along said skin replica.

17. The wearable wound simulant of claim 1, wherein said wound has a penetration cavity which extends beyond said skin replica and capable of probing and packing.

18. The wearable wound simulant of claim 1, wherein said wound has an object that protrudes from a cavity within said wound.

19. The wearable wound simulant of claim 18, wherein said object has visual and tactile properties of an internal organ.

20. The wearable wound simulant of claim 18, wherein said object is attached to said skin simulant so as to be movable.

\* \* \* \* \*